(12) United States Patent
Eguchi et al.

(10) Patent No.: US 8,256,163 B2
(45) Date of Patent: Sep. 4, 2012

(54) GLASS RUN HAVING A MOLDED PART ATTACHED TO A DOORFRAME OF A VEHICLE

(75) Inventors: Tomofumi Eguchi, Hiroshima (JP); Toshifumi Matsuura, Hiroshima (JP)

(73) Assignee: Nishikawa Rubber Co., Ltd., Hiroshima-shi (JP)

( * ) Notice: Subject to any disclaimer, the term of this patent is extended or adjusted under 35 U.S.C. 154(b) by 133 days.

(21) Appl. No.: 12/657,566

(22) Filed: Jan. 22, 2010

(65) Prior Publication Data

US 2010/0126077 A1    May 27, 2010

Related U.S. Application Data

(62) Division of application No. 12/148,150, filed on Apr. 17, 2008, now Pat. No. 7,650,718.

(30) Foreign Application Priority Data

Apr. 24, 2007  (JP) ................................. 2007-113745

(51) Int. Cl.
  *E06B 7/16* (2006.01)
(52) U.S. Cl. .......................... 49/479.1; 49/441; 49/492.1
(58) Field of Classification Search .............. 49/479.1, 49/492.1, 440, 441, 502
See application file for complete search history.

(56) References Cited

U.S. PATENT DOCUMENTS

| 5,799,442 | A | 9/1998 | Takahashi et al. | |
| 6,493,992 | B2 * | 12/2002 | Goto | 49/441 |
| 6,598,348 | B2 * | 7/2003 | Palicki | 49/479.1 |
| 6,725,605 | B2 * | 4/2004 | Schlachter et al. | 49/479.1 |
| 7,086,201 | B2 | 8/2006 | Struyven et al. | |
| 2001/0001917 | A1 * | 5/2001 | Goto | 49/440 |
| 2002/0062596 | A1 | 5/2002 | Palicki | |
| 2002/0139054 | A1 * | 10/2002 | Schlachter et al. | 49/479.1 |
| 2004/0177562 | A1 | 9/2004 | Deguchi et al. | |

FOREIGN PATENT DOCUMENTS

JP    2004-050881    2/2004

* cited by examiner

*Primary Examiner* — Gregory J. Strimbu
(74) *Attorney, Agent, or Firm* — Flynn, Thiel, Boutell & Tanis, P.C.

(57) ABSTRACT

A glass run attached to a doorframe of a vehicle. The glass run comprises a molded part attached to a corner part of the doorframe, and a fin, formed integrally with the molded part, and covering the corner part of the doorframe. The fin includes a hook and lip that protrude from a back of a rim of the fin. The lip provides the rim of the fin with increased rigidity and prevents the rim of the fin from turning up and opening.

5 Claims, 8 Drawing Sheets

GLASS RUN HAVING A MOLDED PART ATTACHED TO A DOORFRAME OF A VEHICLE

CROSS REFERENCE TO RELATED APPLICATION

This application is a divisional of U.S. Ser. No. 12/148,150, filed Apr. 17, 2008, now U.S. Pat. No. 7,650,718, which is incorporated herein by reference in its entirety.

FIELD OF THE INVENTION

The present invention relates to a glass run attached to the doorframes of vehicles and particularly to a glass run having a molded part attached to the corner part of the doorframe.

BACKGROUND OF THE INVENTION

Figure 1:
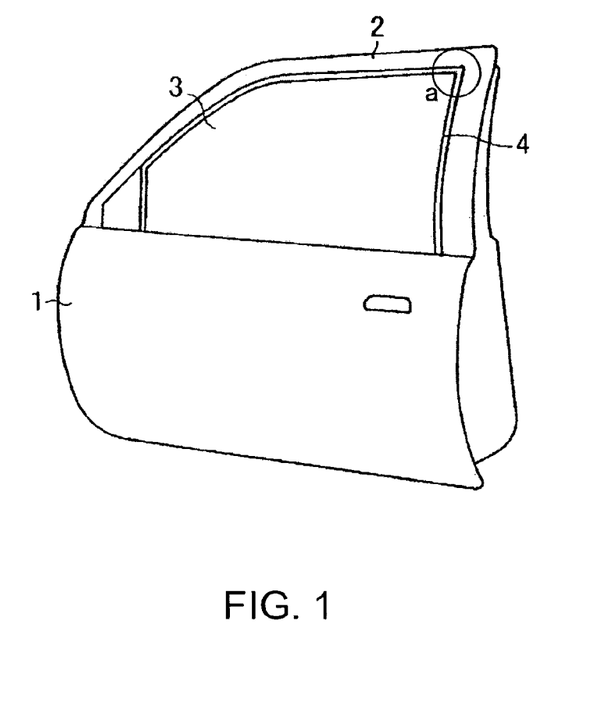
FIG. 1 is a side view of a front door of a vehicle.

A front door 1 of a vehicle shown in FIG. 1 has a glass run 4 attached to the inner side of a doorframe 2 for sealing between the doorframe 2 and a window glass 3. The glass run 4 generally consists of an extrusion attached along the upper side of the doorframe 2, an extrusion attached along the longitudinal part of the doorframe 2, and a molded part ("a" in FIG. 1) attached to the corner part of the doorframe 2 and connecting the two extrusions.

Figure 2:
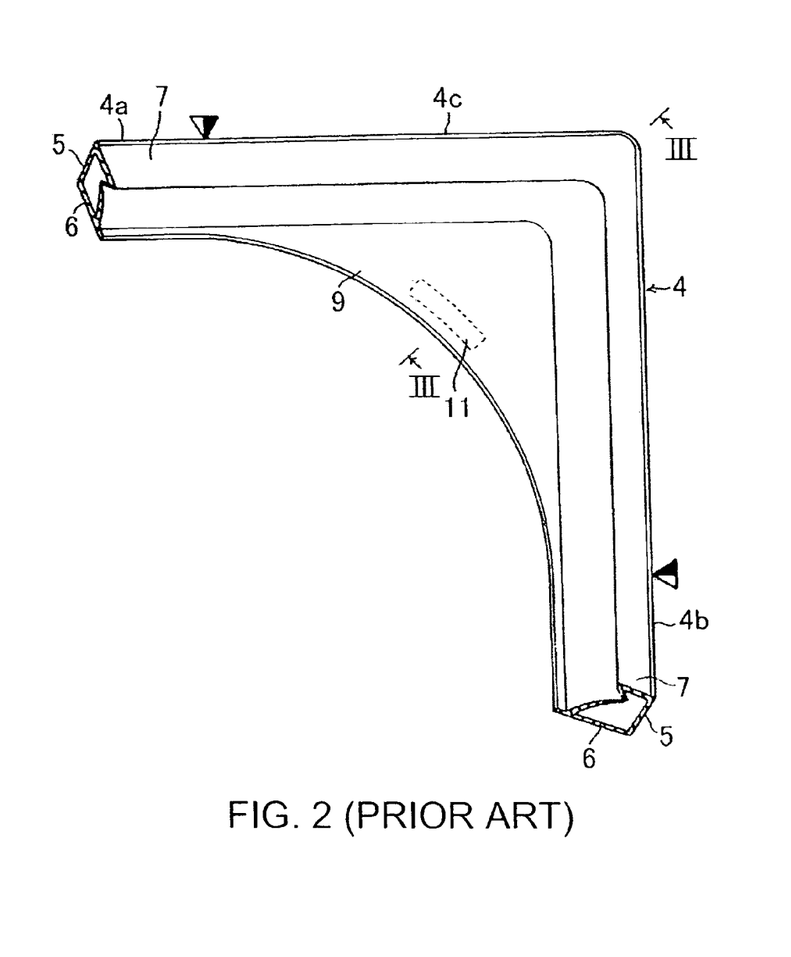
FIG. 2 is a perspective view of a prior art glass run attached to a corner part of a doorframe.
Figure 3:
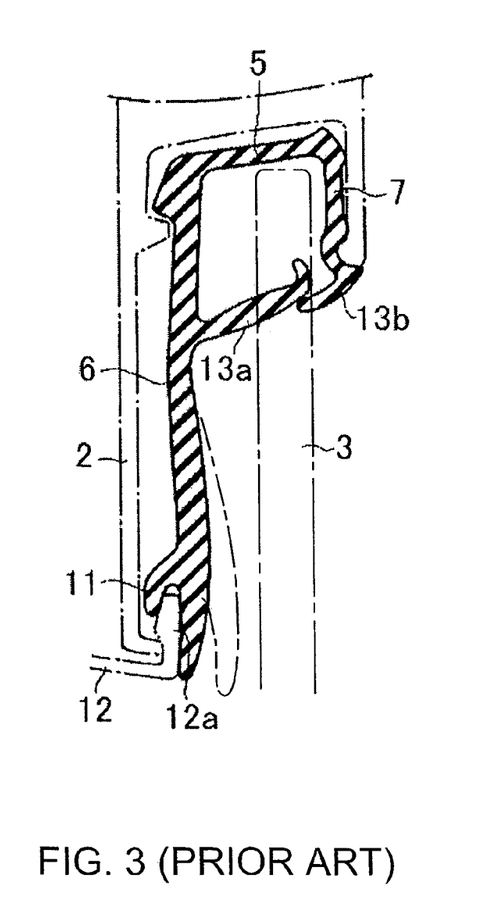
FIG. 3 is a cross-sectional view along the line III-III in FIG. 2.

FIG. 2 shows a glass run 4 disclosed in the Japanese Laid-Open Patent Application No. 2004-50881 that is attached to the corner part of the doorframe 2. FIG. 3 is a cross-sectional view along the line in FIG. 2. The glass run 4 consists of extrusions 4a and 4b, and a molded part 4c, each having a bottom wall 5, an inside wall 6, and an outside wall 7. A fin 9 is formed integrally with the molded part 4c along the inner rim of the corner part for covering the doorframe 2 and improving the integrity with the doorframe 2. A hook-like fastener 11 is integrally formed on the back of the fin 9 along the rim in whole or in part, such as for example in the middle. When the glass run 4 is attached to the doorframe 2 and a garnish or trim 12 is assembled to the doorframe 2, a bent edge 12a of the garnish 12 that protrudes from the doorframe is engaged with the fastener 11 so as to prevent the fin 9 from being uplifted from the doorframe 2 and creating an aperture between the fin 9 and the doorframe 2, which impairs the appearance.

The triangular arrows in FIG. 2 indicate that the molded part is on the blacked-out side thereof and the extrusion is on the non-blacked-out side thereof. The same applies to other figures. In FIG. 3, extending inward from the inside wall 6 and outside wall 7, lips 13a and 13b are resiliently pressed against the window glass 3 for sealing between them and the window glass 3, respectively.

In the glass run shown in FIG. 3, the engagement between the garnish edge and the fastener 11 may be inappropriate due to some assembling error with the glass run 4 and the garnish 12. Consequently, the fin 9 may be shifted outward and an aperture may be created between the fin 9 and the garnish 12 as shown by the dash-dot line in FIG. 3.

The purpose of the present invention is to provide a glass run that keeps the rim of the fin from opening even if there is any assembling error with the glass run 4 and the garnish 12 so that no aperture is created between the fin 9 and the garnish 12.

SUMMARY OF THE INVENTION

The present invention provides a glass run attached to a doorframe of a vehicle provided with a garnish, comprising a molded part attached to the corner part of the doorframe and a fin formed integrally with the molded part and covering the corner part of the doorframe. The fin has first hooks on the back along the rim. The first hooks are each engaged with a cutout formed in the doorframe so that the doorframe holds the fin.

Another embodiment of the present invention is a glass run attached to a doorframe of a vehicle provided with a garnish, comprising a molded part attached to a corner part of the doorframe, and a fin, formed integrally with the molded part, for covering the corner part of the doorframe. The fin has a second hook on the back along a rim of the fin, and a lip protruding in a direction opposite to the second hook and being resiliently pressed against the doorframe. The second hook is engaged with a bent edge of the garnish that protrudes from the doorframe.

DETAILED DESCRIPTION

Figure 4:
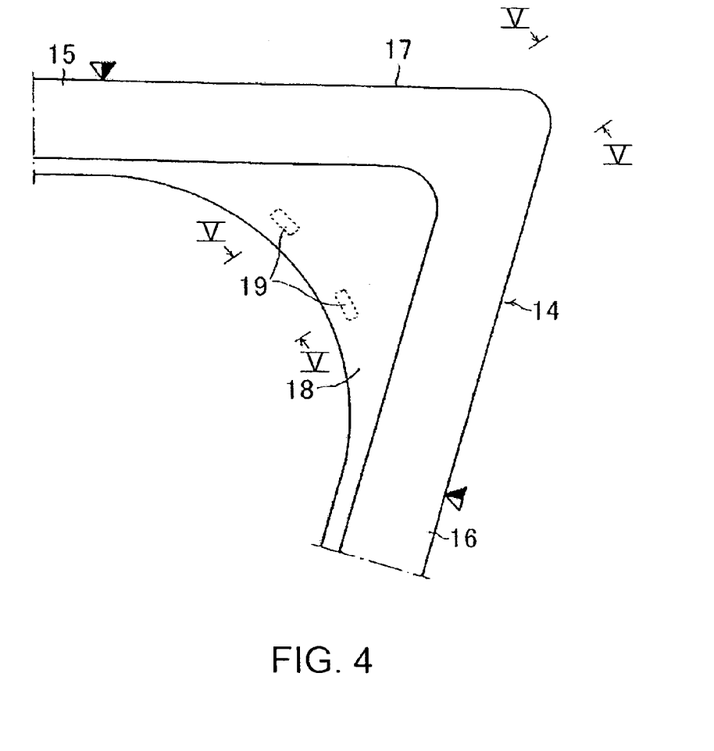
FIG. 4 is a front view of the glass run of the present invention attached to the corner part of the doorframe.

FIG. 4 shows a glass run 14 attached for example to a corner part of a doorframe 2 of the front door 1 of a vehicle shown in FIG. 1. The glass run 14 comprises an extrusion 15 attached along the upper side of the doorframe 2, an extrusion 16 attached along the longitudinal part of the doorframe 2, a molded part 17 attached to the corner part of the doorframe 2 connecting the two extrusions 15 and 16, and a fin 18 along the inner periphery for covering the corner part of the doorframe 2. The fin 18 is formed integrally with the molded part 17.

Figure 5:
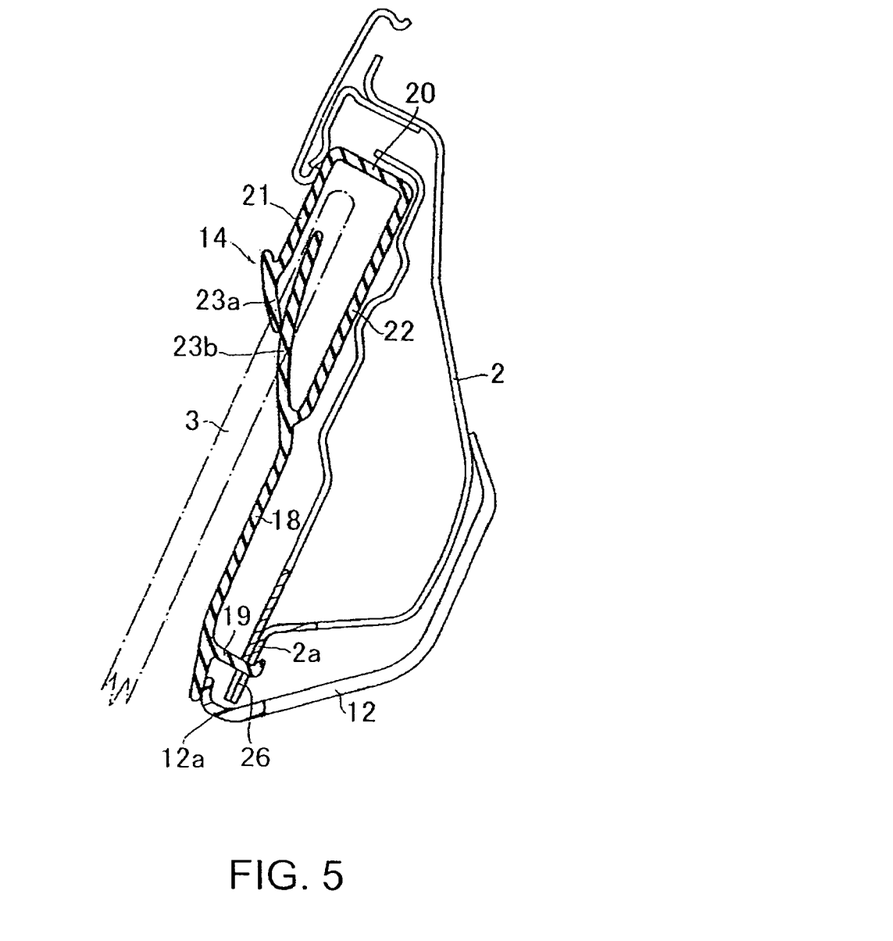
FIG. 5 is a cross-sectional view along the line V-V in FIG. 4.

FIG. 5 is a cross-sectional view along the line V-V in FIG. 4. The glass run 14 comprises a bottom wall 20, an outside wall 21, and an inside wall 22. The fin 18 is extended from the inside wall 22. A pair of first hooks 19 protrudes from the back of the fin 18 in the middle along a rim of the fin 18, and the hooks 19 are properly apart from each other. When the glass run 14 is attached to the corner part of the doorframe 2, each of the hooks 19 is engaged with a cutout 26 formed in a flange 2a of the doorframe 2. In the figure, the reference numbers 23a and 23b identify lips that are extended inward from the outside and inside walls, respectively, and are resiliently pressed against the window glass 3 to seal between them and the window glass 3.

The glass run 14 of the embodiment allows the first hooks 19 to be engaged with the cutouts 26 in the flange 2a so that the flange 2a holds the rim of the fin regardless of any assembly error with the doorframe 2 and garnish 12. Therefore, the rim of the fin 18 does not open, preventing any aperture between the fin 18 and the bent edge 12a of the garnish 12.

The molded part 17 of the glass run 14 attached to the corner part of the doorframe 2 of this embodiment can have on the fin 18 a fastener 11 that fastens on the bent edge 12a of the garnish 12 as in the prior art glass run 4 shown in FIG. 3. With the fastener 11 being provided on the fin 18 in addition to the hooks 19, the first hooks 19 are engaged with the cutouts 26 in the flange 2a, and the fastener 11 further fastens on the bent edge 12a of the garnish 12, which ensures that the rim of the fin 18 does not open. When the fin 18 is provided with the first hooks 19 and fastener 11, the fastener can be provided to fasten on the bent edge 12a of the garnish 12 even if the first hooks 19 fail to be engaged with the cutouts, and no aperture will be created between the fin and the garnish 12 as a result of the opened fin.

Although the molded part 17 of this embodiment has a pair of the protruding first hooks 19, three or more hooks or only one hook 19 can be formed in the middle along the rim of the fin 18 or along the entire rim of the fin 18.

Figure 6:
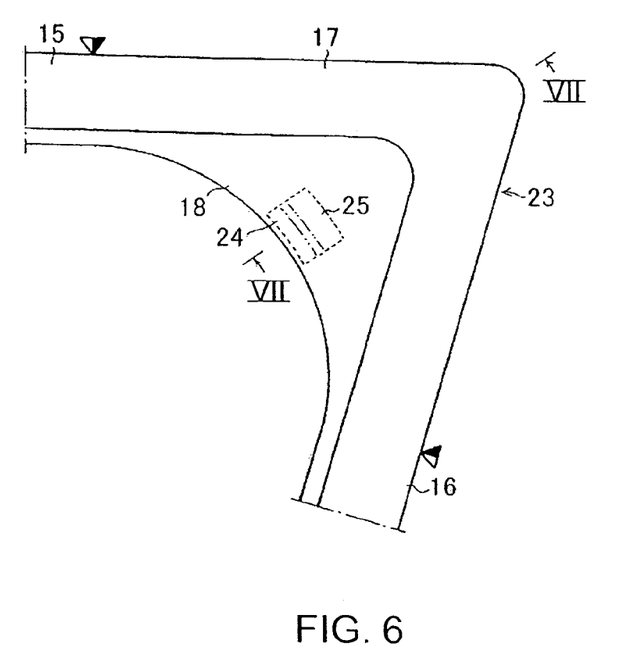
FIG. 6 is a front view of a second embodiment of the glass run of the present invention attached to the corner part of the doorframe.
Figure 7:
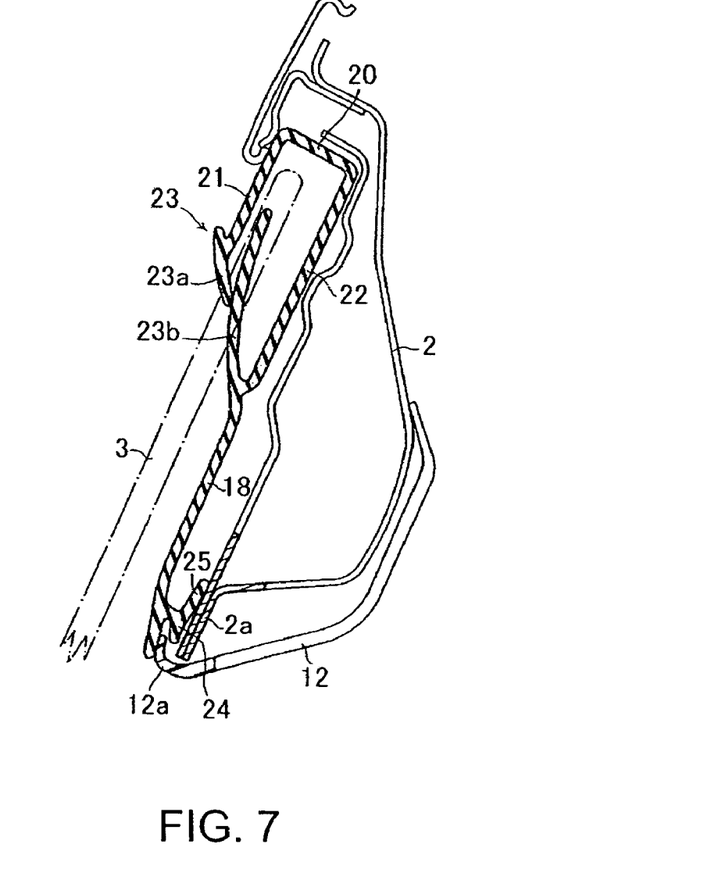
FIG. 7 is a cross-sectional view along the line VII-VII in FIG. 6.

FIG. 6 shows another embodiment of the glass run 23 attached to the corner part of the door frame 2. FIG. 7 is a cross-sectional view along the line VII-VII in FIG. 6. The glass run 23 of this embodiment has the same structure as the glass run 14 shown in FIGS. 4 and 5 except that a second hook 24 corresponding to the fastener 11 is formed on the back in the middle along the rim 28 of the fin 18 and a lip 25 protrudes in a direction opposite to the second hook 24 increasingly away from the fin 18 up to the tip instead of forming the pair of first hooks 19 along the rim of the fin 18.

In the glass run of this embodiment, the lip 25 protruding in the direction opposite to the second hook 24 provides the rim of the fin 18 with increased rigidity, preventing the rim of the fin 18 from turning up and opening. Therefore, the fin 18 does not open and no disfiguring aperture is created between the bent edge 12a of the garnish 12 and the glass run 23. The lip 25 is increasingly spaced from the fin 18. When the glass run 23 is attached to the doorframe 2, the lip 25 is bent into the inside of the vehicle. When the lip 25 is pressed against the doorframe 2, the rim of the fin 18 has a rigidity increased by the lip 25 and is turned by the reaction force created as the lip 25 is pressed against the doorframe 2 inward or in the counterclockwise direction in FIG. 7 about the engaging part between the second hook 24 and the garnish 12 as the supporting point. The fin rim is then pressed against the bent edge 12a of the garnish 12.

Figure 8:
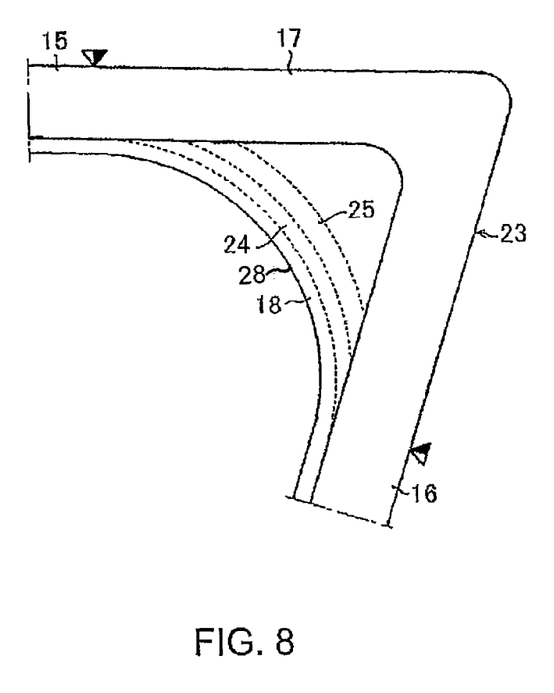
FIG. 8 is a front view of a third embodiment of the glass run of the present invention attached to the corner part of the doorframe.

The second hook 24 and the lip 25 of this second embodiment are integrally formed. They can be formed at one position, in multiple positions, or along the entire rim of the fin 18 like the first hooks 19 in the above embodiment. FIG. 8 shows a third embodiment in which the second hook 24 and the lip 25 are formed along the entire rim of the fin 18.

What is claimed is:

1. A glass run attached to a doorframe of a vehicle for resiliently sealing with a window glass of the vehicle, the doorframe including an inner doorframe edge and a garnish having a garnish edge which extends along the doorframe edge and is bent over the doorframe edge, said glass run comprising two extruded parts and a molded part extending from one of said extruded parts to the other of said extruded parts and attached to a corner part of the doorframe for sealing with the window glass, said molded part including a fin covering the corner part of the doorframe, a back of said fin overlying the corner part, and said fin formed integrally with the molded part so as to project inwardly over the corner part and define a rim, said rim extending from one of said extruded parts to the other of said extruded parts and is disposed adjacent said garnish edge and said doorframe edge, said doorframe edge facing towards said back of said fin and said fin comprising at least one hook protruding from the back of the fin along the entire rim of the fin and extending in a first direction inwardly into engagement with said garnish edge, said fin further including a lip projecting outwardly away from said hook in a direction opposite to said first direction and being increasingly spaced from the back of the fin towards a tip thereof and preventing the rim of the fin from turning up and opening.

2. The glass run according to claim 1, wherein said rim has an engaging part which projects toward said doorframe edge and has said lip and said hook projecting therefrom.

3. The glass run according to claim 2, wherein said rim has a rim portion projecting inwardly from said engaging part, and said lip urges said rim portion toward said garnish edge and said doorframe edge.

4. The glass run according to claim 1, wherein said hook is disposed between said garnish edge and said doorframe edge.

5. The glass run according to claim 4, wherein said rim has an engaging part and the hook and the lip are supported in spaced relation from said rim by said engaging part.

* * * * *